United States Patent [19]

Monia

[11] Patent Number: 4,704,648
[45] Date of Patent: Nov. 3, 1987

[54] LAMINATED HEAD CLEANING DISK

[75] Inventor: Victor Monia, Saratoga, Calif.

[73] Assignee: Visa Technologies, Inc., Mountain View, Calif.

[21] Appl. No.: 711,087

[22] Filed: Mar. 12, 1985

[51] Int. Cl.⁴ .............................................. G11B 5/41
[52] U.S. Cl. .................................................... 360/128
[58] Field of Search ..................... 360/128, 133, 135; 15/DIG. 12

[56] References Cited

U.S. PATENT DOCUMENTS

| | | | |
|---|---|---|---|
| 4,106,067 | 8/1978 | Masuyama et al. | 360/137 |
| 4,180,840 | 12/1979 | Allan | 360/128 |
| 4,375,658 | 3/1983 | Martinelli | 360/128 |
| 4,499,516 | 2/1985 | Purdy et al. | 360/128 |
| 4,586,100 | 4/1986 | Howe et al. | 360/128 |

FOREIGN PATENT DOCUMENTS 1074444  3/1980  Canada .
2045508  10/1980  United Kingdom .

Primary Examiner—Robert S. Tupper
Assistant Examiner—Melissa J. Koval
Attorney, Agent, or Firm—Cushman, Darby & Cushman

[57] ABSTRACT

A cleaning disk is described that is made of a pair of layers of head-cleaning material which are translucent to light produced by a light source in a magnetic disk-reading machine. The layers are adhered with an adhesive having sufficient opacity caused by the addition of pigment to reduce the light transmitted through the layers from the light source enough to prevent sensing of the light by the corresponding light sensor. Fibers of the layers, when made of fabric, may extend through the adhesive to provide for permeation of a solvent from one layer to the other. The layers are preferably adhered by heat plastified thermoplastic polymeric adhesive which is compressed between non-heat-plastified layers and which is formed to have solvent-transmitting holes extending through it.

11 Claims, 4 Drawing Figures

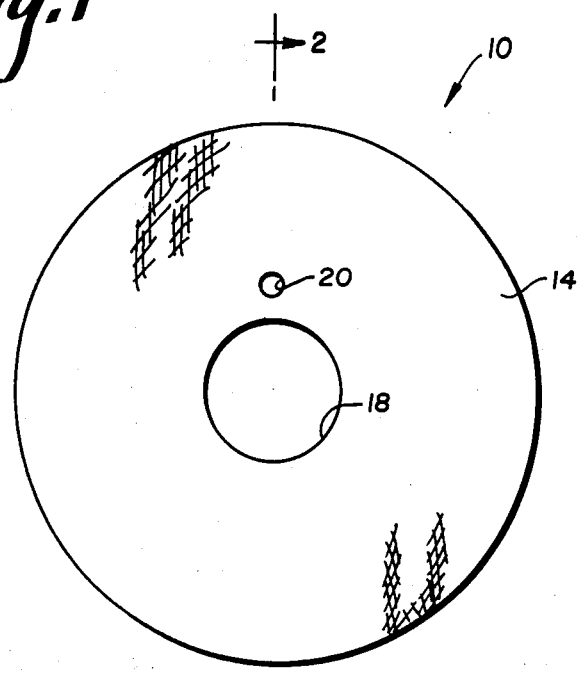
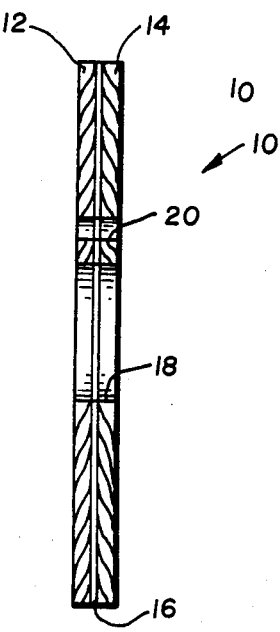
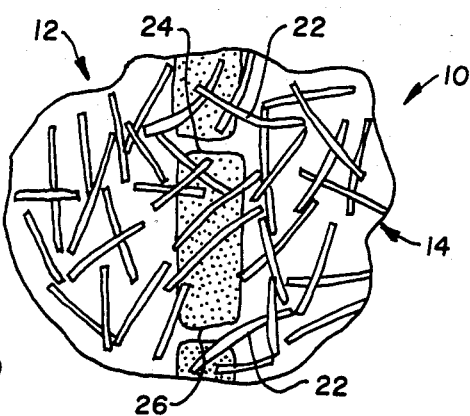
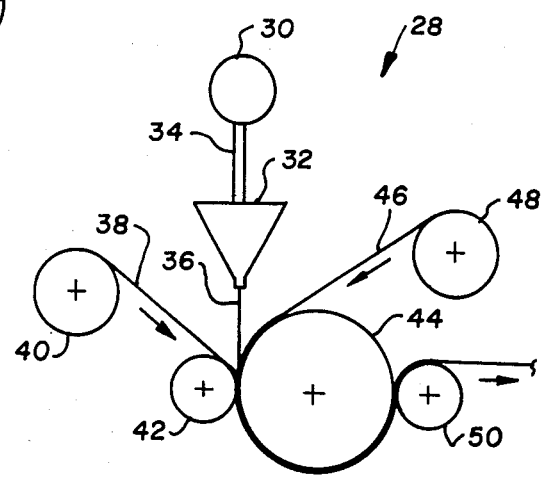

LAMINATED HEAD CLEANING DISK

BACKGROUND OF THE INVENTION

This invention pertains to a disk for cleaning magnetic transducer heads in magnetic disk-reading machines having a light source and light sensor for detecting the presence of a disk. More particularly, it pertains to such a disk formed of a pair of layers of head-cleaning material joined by a solvent transmitting, light transmission reducing adhesive.

The magnetic heads of flexible disk systems must be cleaned periodically in order to maintain desirable performance standards. Because of the difficulty of accessing magnetic heads on flexible disk drives, various forms of cleaning disks have been developed. Initially, cleaning disks contained an abrasive lapping material to lap the magnetic heads to remove the contaminants. These cleaning disks, if used for too long, also lap the transducer head itself, causing damage to it. Such a system is disclosed in U.S. Pat. No. 4,180,840 to Allan. This system also includes a smooth surface on the face of the cleaning disk opposite the abrasive material and is constructed using heat pressure lamination.

A system similar to that disclosed in Allan is described in Canadian Pat. No. 1,074,444 and U.S. Pat. No. 4,106,067, and both issued to Masuyama at al. The patents to Masuyama disclose a large variety of laminated cleaning disks with surface layer makeup varying from abrasive to non-abrasive materials laminated on a self-supporting base core. These laminated cleaning disks also have an impermeable center sheet layer. It is necessary to apply solvent to both sides of these disks in order to clean transducer heads disposed on both sides of the disk. As stated in the referenced prior art it is necessary to limit the large openings in a supporting disk jacket to one side so that the cleaning disk contained by the jacket will be supported by the other side. This makes it difficult to apply solvent to both sides.

Because of its ease of manufacture, cleaning disks formed of a single layer of fabric material have also been produced. Such disks, typically made of spun bonded polyester or olefin, are disclosed in U.S. Pat. No. 4,498,114 issued to Davis and Great Britain Pat. No. 2,045,508, issued to Davis et al. These single layer fabric cleaning disks adequately hold solvent but do not withstand much wear from repeated use because of the lack of durability of the fibrous material. Further, they tend to be so translucent to the sensor light on the disk drives that they do not provide reliable operation. As a result opaque rings were developed which are adhered to or painted on fabric disks in order to provide an opaque ring which could result in reliable operation. Such cleaning disks are shown in U.S. Pat. Nos. 4,499,516 issued to Purdy et al. and 4,375,658 issued to Martinelli. These latter two patents also show the use of reinforcement rings around the spindle hole in the cleaning disk to provide for more durable construction. The adhesive used to bond or ink used to form the opaque rings on these cleaning disks leach out contaminants when solvent is applied to them. This lessens the effectiveness of the disk and even provides contaminants which may attach to a transducer head intended to be cleaned.

The head-cleaning construction art has therefore not developed a substantially full-fabric cleaning disk which is durable and opaque enough to withstand repeated use reliably.

SUMMARY OF THE INVENTION

The present invention provides a cleaning disk formed of two adhered layers of head cleaning material. The adhesive joining the layers serves to reinforce the head-cleaning material and also preferably is used to reduce the amount of light transmittable through the adhered layers. Such a cleaning disk is also most desirably formed to provide for permeation of a solvent from one layer to the other. It is thus possible to have a substantially full-fabric, durable and opaque cleaning disk which can be fabricated using large-scale production techniques without requiring any expensive custom work to the disks after they are stamped out of the completed laminated sheets of material.

The preferred method of making a cleaning disk according to the invention includes producing a film of heat-plastified thermoplastic material. Confronting faces of a pair of layers of non-heat-plastified head-cleaning material are pressed against opposite faces of the film. The resulting laminate is cooled until the film hardens. The method preferably includes adding a light transmission reducing pigment to the heat plastified material. Further, the film is preferably made to have, when compressed by the fabric, holes extending through it.

These and additional objects and advantages of the present invention will be more clearly understood from a consideration of the drawings and the following detailed description of the preferred embodiment.

BRIEF DESCRIPTION OF THE DRAWING

With reference to the accompanying sheet of drawing:

FIG. 1 is a top plan view of a cleaning disk made according to the present invention;

FIG. 2 is a sectional view of the disk of FIG. 1 taken along line 2—2 with the thickness enlarged;

FIG. 3 is an enlarged fragmentary portion of FIG. 2 showing in more detail the structure of the disk; and FIG. 4 is a simplified schematic illustration of apparatus for practicing a preferred method of the invention.

DETAILED DESCRIPTION OF PREFERRED EMBODIMENTS AND PREFERRED METHOD OF PRACTICING THE INVENTION

Referring initially to FIGS. 1, 2, a cleaning disk, shown generally at 10, made according to the present invention includes a pair of oppositely facing layers 12, 14 made of head-cleaning material. The material preferably releasably retains an appropriate head-cleaning solvent. It should also be lint-free and pick up contaminants and debris from the heads of flexible disk systems. Materials desirably used for layers 12, 14 include spun-bonded polyester, such as DuPont Reemay. Each layer is approximately 10 to 12 mils (254–306 microns) thick. Although various solvents may be used, a preferred solvent is a flourocarbon compound, such as those produced by DuPont Freon mixed with isopropyl alcohol.

Means are provided for adhering a pair of confronting faces of the layers. This is embodied in an adhesive 16 formed of a thermoplastic polymeric adhesive. As will be discussed further, shortly, layers 12, 14 are bonded together using a 0.5 to 1.2 mil (13 to 30 microns) thickness of extruded polyolefin. An adhesive thickness of 1.0 mil is typical. Other forms of bonding may also provide effective adhering of the two layers. Disk 10 also includes a centrally disposed spindle aperture 18 for accommodating a drive shaft spindle of a disk drive system. An index aperture 20 spaced from spindle aperture 18 is positioned to be sensed by a light sensing system of a disk drive system. As disk 10 is rotated by a drive unit, light from a light source in a photoelectric system passes through aperture 20 for sensing by a light sensor. The light sensor detects the transition in the amount of light received and provides signals which indicate that the disk is in position within the flexible disk drive system. This detection is necessary in order for the system to allow a transducer head to be placed against the cleaning disk. In a purely fabric disk there is enough porosity and general translucence through the fabric to keep the sensors from sensing an appropriate transition. In keeping with the invention, a pigment is included within adhesive 16. That is, typically 3 to 5% of titanium dioxide or 2 to 4% carbon black provide more than sufficient opacity in the disk for aperture 20 to be sensed by the light sensing system. Other pigments or materials may be used to provide means for reducing the amount of light transmittable through the layers from a light source.

Some all-fabric cleaning disks with rings have been measured to have a light transmissivity in excess of 2%. On the other end of the spectrum actual recording media have a light transmissivity near zero. It has been found that if a light transmissivity of less than 1% is obtained, reliable light sensing is assured. The preferred embodiment of the present invention has been found to have transmissivity of between 0.6 and 0.4%.

Referring now particularly to FIG. 3, another salient feature of the present invention is illustrated. FIG. 3 shows a simplified enlarged fragmentary portion of FIG. 2 which includes parts of layers 12, 14, including representative specific fibers 22 from one or both layers and adhesive 16. As has been mentioned, layers 12, 14 are preferably adhered by adhesive 16 by compressing the layers when they are non-heat-plastified against adhesive 16 which is heat plastified. Thus, during the compressing, fibers 22 are relatively cool compared to the adhesive. With the adhesive in a molten or fluid state, as the layers are compressed against each other, sandwiching the adhesive between them, the solid fibers penetrate through the adhesive, as shown in FIG. 3. As projecting fibers 22 penetrate the adhesive, conduits such as conduit 24 are produced which allow solvent applied to one layer to permeate through to the other layer. Additionally, as is well known by one skilled in the art, the mechanical forces acting on a thin sheet during its formation can be controlled in order to produce holes in it. Adhesive 16 is preferably made to have same such holes as is illustrated by hole 26 shown in FIG. 3.

This provides a particular advantage to the present invention. As is shown particularly in the previous referenced Great Britain Pat. No. 2,045,508 and U.S. Pat. No. 4,498,114, jackets for holding and supporting cleaning disks typically have a single extended opening on one face to provide for the addition of solvent to an all-fabric disk. In an application where transducer heads exist on both sides of a disk, it is desirable to apply solvent to both faces of the cleaning disk in order to clean both heads. In an all-fabric cleaning disk, solvent applied to one face is absorbed throughout the fabric. However, in cleaning disks as described in previously referenced Canadian Pat. No. 1,074,444, solvent applied to one side of a laminated disk having an impermeable core sheet does not reach the other side. It is thus difficult to apply solvent to the other side without making an enlarged opening on the other side of the jacket as well. With such an opening on both sides of a jacket, the cleaning disk would not have support.

The present invention provides an effective way to overcome this problem. The solution is provided by a disk having two layers of head-cleaning material capable of releasably holding a head-cleaning solvent joined by a solvent permeable adhesive. Solvent applied to one layer penetrates through the holes of adhesive (described previously) to the other layer. As is the case with other fabric cleaning disks, it is then inserted into a disk drive having one or more transducer heads to be cleaned. The disk drive is activated to press the heads against the disk while rotating the disk. After about 90 seconds, the heads are typically essentially completely cleaned.

Reference is now made to FIG. 4 for illustration of an apparatus usable in practicing a preferred method of making a head-cleaning disk according to the present invention. The apparatus, shown generally at 28, includes an extruder 30 containing heat plastified thermoplastic material which has added to it the light-transmission reducing pigment described previously. Extruder 30 is joined in communication with a die 32 through a conduit or adapter 34. Die 32 has an extrusion orifice from which issues a stream 36 of heat plastified thermoplastic material in the form of a film approximately 1 mil (25 microns) thick. When polyolefin is used as the adhesive, this film preferably has a temperature of approximately 605° F. (318° C.). A fabric 38, preferably a spunbonded polyester, feeds off of a roller 40 past a nip roller 42 which presses toward a chill roller 44. Another layer of fabric 46 feeds off of a roller 48 and around roller 44. Rollers 42, 44 sandwich heat plastified film 36 between fabrics 38, 46. The resulting fabric laminate is held in compression and cooled around roller 44. It is then delivered across a strip roller 50 for further processing in which they are stamped in the form of cleaning disks having apertures 18, 20 and a circular shape as shown in FIG. 1.

From the above, it will be appreciated that a head cleaning disk and method of making and using it according to the present invention provides significant advantages over the prior art. In particular, a substantially full-fabric cleaning disk is formed having a sufficient level of opacity to effectively and reliably operate a light sensing system of a flexible disk drive unit. The disk is relatively inexpensive to manufacture and does not require customized processing after the disk is stamped from the production sheet. Although the invention has been described in connection with a preferred embodiment and preferred method of making it, it will be appreciated that various changes and modifications can be made without departing from its spirit. It is therefore intended that the coverage afforded applicant be limited only by the claims and their equivalent language.

What is claimed is:

1. A head-cleaning disk for cleaning magnetic transducer heads in magnetic disk-reading machines having a light source and light sensor for detecting the presence of a disk therein comprising:

a pair of layers of head-cleaning material which are translucent to the light produced by the light source of a magnetic disk-reading machine, each layer having oppositely directed faces; and means for adhering a pair of confronting faces of said layers, said adhering means having disposed in it light-transmission-reducing pigment means for reducing the amount of light transmitted through said adhered layers from the light source sufficiently to prevent sensing of the light by the light sensor of a magnetic disk-reading machine;

said disk further comprising a central opening through which the drive unit of the disk-reading machine passes, and a sensing area which passes between the source and sensor, said sensing area including a substantially transparent first section and a second section formed by said adhered layers, wherein the machine rotates said head-cleaning disk to alternately bring said first and second sections in a position between the light source and light sensor.

2. The disk of claim 1 wherein said layers are head-cleaning solvent absorbant and wherein said means for adhering is formed to allow solvent applied to one of said layers to pass from said one layer to the other of said layers.

3. The disk of claim 2 wherein said adhering means is formed of an adhesive and said layers are made of a fabric material having fibers penetrating through said adhesive.

4. The disk of claim 2 wherein said adhering means is formed of an adhesive having solvent-transmitting holes extending through it from one of said layers to the other of said layers.

5. The disk of claim 1 wherein said means for adhering comprises an adhesive including sufficient pigment means to reduce the average light transmissivity of the adhered layers to at most one percent.

6. A head-cleaning disk for cleaning magnetic transducer heads in magnetic disk-reading machines comprising:

a pair of layers of head-cleaning material for holding a head-cleaning solvent applied to them, each layer having oppositely directed faces;

means for adhering a pair of confronting faces of said layers; and means disposed in said adhering means for allowing solvent applied to one of said layers to pass through said adhering means to the other of said layers.

7. The disk of claim 6 wherein said layers further are formed of fabric material having fibers which extend through said adhering means.

8. The disk of claim 6 wherein said adhering means comprises a sheet-like adhesive and said allowing means includes solvent-transmitting holes extending through said adhesive.

9. The disk of claim 6 wherein said adhering means consists of a sheet-like adhesive and the disk-reading machines have a light source and light sensor for detecting the presence of a disk between them and said adhesive further includes means for reducing the amount of light transmitted through said layers from the light source sufficiently to prevent sensing of the light by the light sensor.

10. The disk of claim 9 wherein said reducing means includes light transmission retarding pigment means disposed in said adhesive.

11. The disk of claim 8 wherein said layers are formed of a fabric material having fibers and said allowing means further includes fibers extending between said layers through at least some of said holes.

* * * * *